Feb. 12, 1957 C. C. AVERILL 2,781,184
MATERIAL HANDLING PALLET
Filed May 21, 1953 3 Sheets-Sheet 1

INVENTOR.
Charles C. Averill
BY
Otto A. Earl
Attorney.

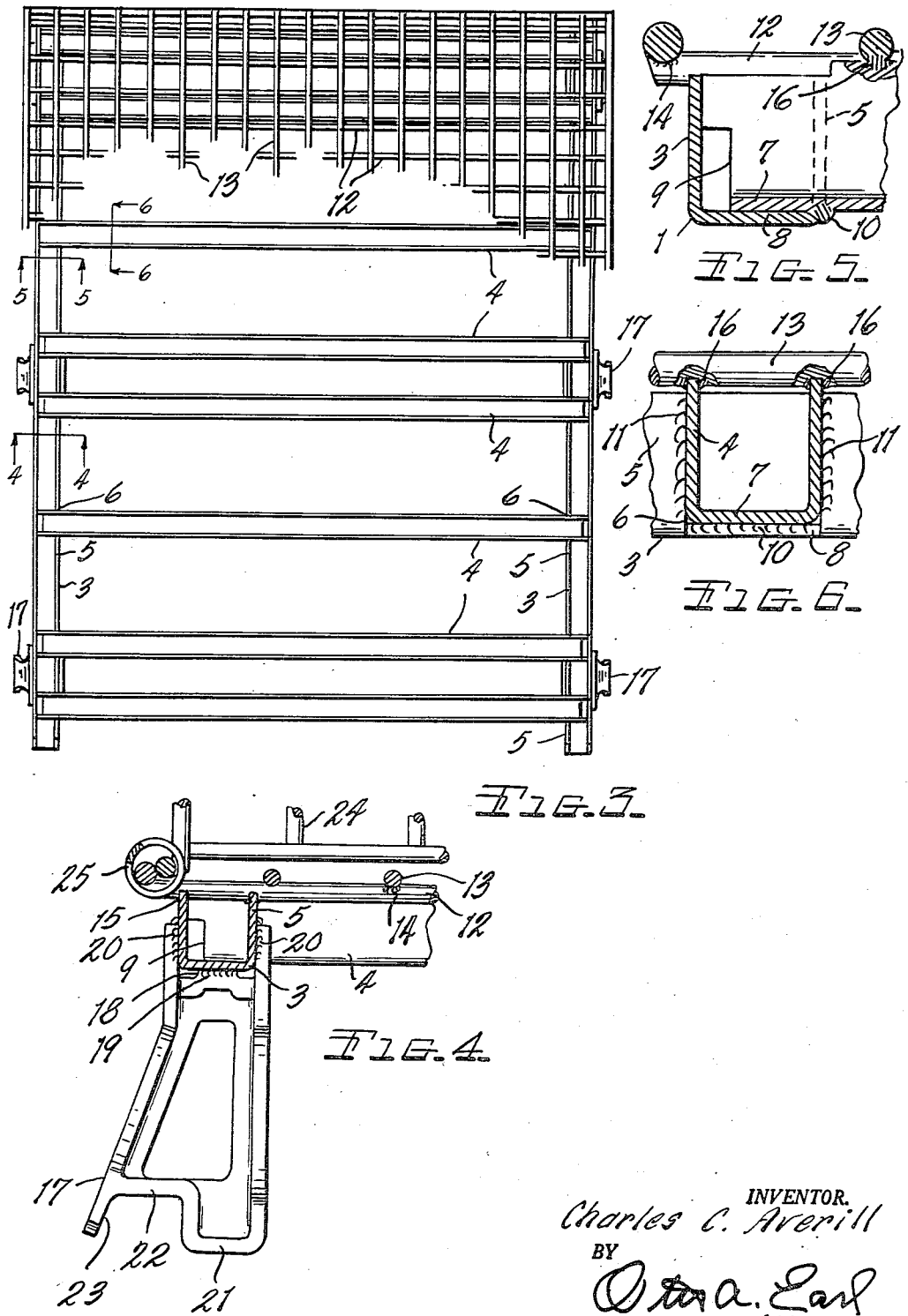

Feb. 12, 1957  C. C. AVERILL  2,781,184
MATERIAL HANDLING PALLET
Filed May 21, 1953  3 Sheets-Sheet 3

INVENTOR.
Charles C. Averill
BY Otma Earl
Attorney

United States Patent Office 2,781,184
Patented Feb. 12, 1957

2,781,184

MATERIAL HANDLING PALLET

Charles C. Averill, Albion, Mich., assignor to Union Steel Products Company, Albion, Mich., a corporation of Michigan Application May 21, 1953, Serial No. 356,480

6 Claims. (Cl. 248—120)

This invention relates to improvements in a material handling pallet.

The main objects of this invention are:

First, to provide a material handling pallet which is very rigid in proportion to the weight of the material incorporated therein and one which is capable of sustaining heavy loads and withstanding the variously directed shocks and stresses which may be imparted thereto in the use thereof.

Second, to provide a material handling pallet which may be handled with the platform type of trucks as well as from the fork type, and which may be pushed or dragged about when loaded without serious injury thereto.

Third, to provide a walled material handling pallet in which one loaded pallet may be stacked upon another even when loaded to the extent that material projects above the top of the walls.

Fourth, to provide a material handling pallet having these advantages which may be readily adapted for transportation on conveyors.

Objects relating to details and economies of the invention will appear from the description to follow. The invention is defined and pointed out in the claims.

A preferred embodiment of the invention is illustrated in the accompanying drawings, in which:

Fig. 3 is a plan view with a portion of the deck flooring broken away, the walls being omitted.

Fig. 4 is an enlarged fragmentary view on a line corresponding to line 4—4 of Figs. 1 and 3.

Fig. 5 is an enlarged fragmentary view on a line corresponding to line 5—5 of Fig. 3.

Fig. 6 is an enlarged fragmentary view on a line corresponding to line 6—6 of Fig. 3.

Figure 1:
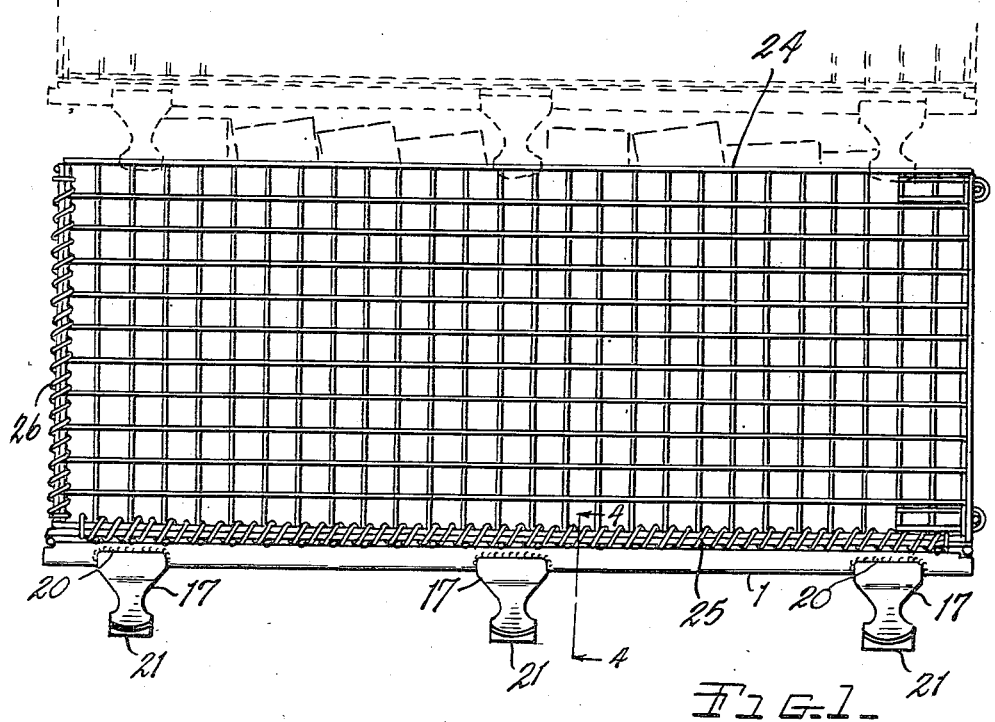
Fig. 1 is a side elevational view of a walled pallet embodying my invention, a superimposed pallet being illustrated by dotted lines, the projection of the load above the top of the walls being indicated by dotted lines.

The embodiment of my invention illustrated comprises a deck bed designated generally by the numeral 1 formed as a separate unit, and a deck flooring unit 2 preferably grid-like. The deck bed comprises side sill members 3,3 of upwardly facing channel section and cross members or joist members 4 also of upwardly facing channel section.

The inner flanges or legs 5 of the sill members have openings 6 extending from the top to bottom thereof and of a width to receive the joist members with the webs or bottoms of the joist members 7 resting upon the webs or bottoms 8 of the sill members as is shown in Figs. 5 and 6. The ends of the joist members are preferably in abutting relation to the inner sides of the outer flanges or legs of the sill members as shown in Fig. 5 with the exception that the ends of the joist or cross members are cut away at 9 primarily to provide drainage.

It will be noted that the joist members are directly supported on the sill members and they are welded thereto at 10 and the flanges of the sill members are welded to the inner flanges of the sill members as indicated at 11. The joist members provide effective tie members for the sill members.

Figure 2:
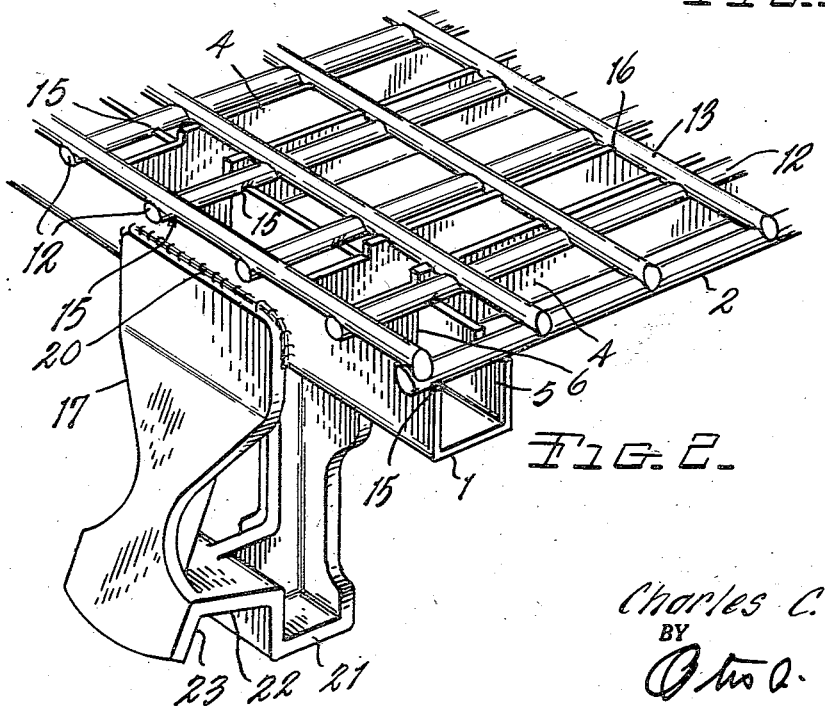
Fig. 2 is an enlarged fragmentary perspective view.

The deck flooring designated generally by the numeral 2 comprises a spaced parallel lower series of rod-like slats or elements 12 and an upper series of spaced parallel slats or elements 13, these being welded at their crossing points as indicated at 14. This deck unit is placed upon the deck bed with the lower series of the deck flooring slats in parallel relation to the joist memberes and welded to the flanges of the sill members at their crossing points as at 15. The upper deck slats are welded to the joist members at their crossing points as indicated at 16. The welds result in more or less imbedding the parts at their welding points as is indicated in Fig. 2. This provides a very strong and rigid deck structure capable of carrying very heavy loads in proportion to the weight of the material used.

The legs 17 are desirably formed as castings and have saddle-like seats 18 in their upper ends of such size as to fittingly receive the sill members as is best shown in Fig. 4, the sill members resting on the bottoms of the seats so that the load is not carried by the welds 19 and 20 securing the legs to the bottoms of the sills and to the flanges thereof respectively.

In the embodiment illustrated the base portions 21 of the legs are provided with upward offsets 22 forming downwardly facing stacking recesses 23 adapted to engage the walls 24 when walls are used. These walls are desirably of the grid or open mesh type, opposed walls being hingedly secured as by the coils 25 to the longitudinal outer bars of the grid flooring, one side and end member of the walls being collapsibly connected by the coils 26. The walls, however, form no part of my present invention and are therefore not described in further detail. They are illustrated to show the adaptability of my invention to stacking walled pallets.

The embodiment of my invention as illustrated in Figs. 1 to 6, inclusive, is well adapted for handling not only by forked types of lifting trucks but also the platform type as the platform may be run under the deck bed between the legs.

Figure 7:
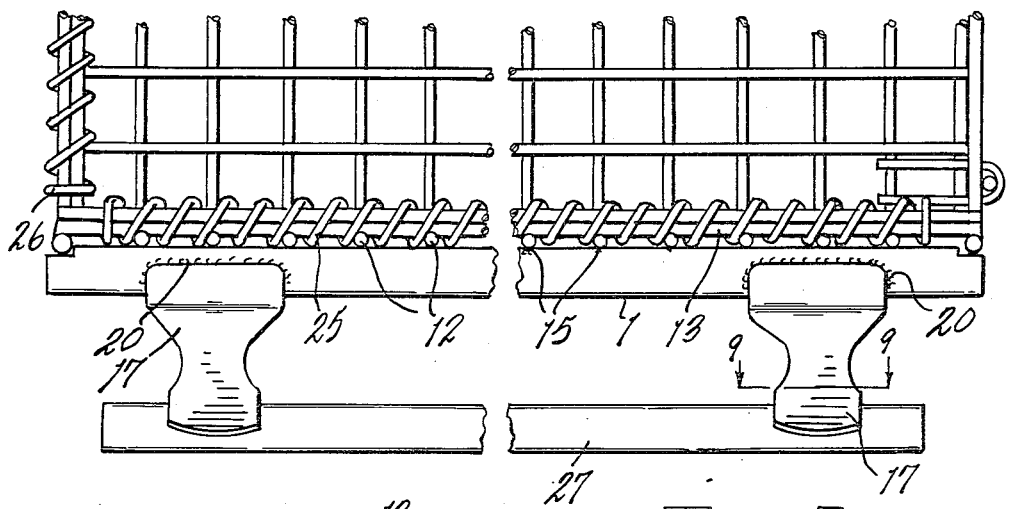
Fig. 7 is a side elevational view of a modified form or embodiment of the invention in which base bars are incorporated to adapt the pallet for conveyance on a conveyor and also to provide runners.
Figure 8:
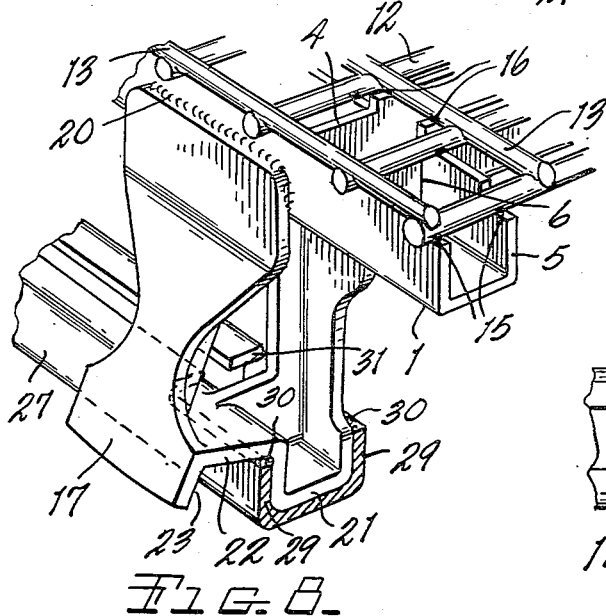
Fig. 8 is a fragmentary perspective view of the embodiment shown in Fig. 2 with the base bar attached thereto.
Figure 9:
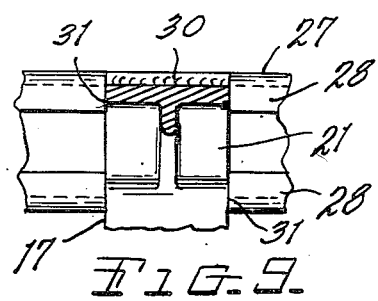
Fig. 9 is a fragmentary view in horizontal section on line 9—9 of Fig. 7.

In the embodiments of Figs. 7, 8 and 9, base bars 27 are provided, these being of upwardly facing channel section and having inturned flange portions 28 on the edges of their legs 29. These base bars are proportioned so that they fittingly receive the base portions 21 of the legs and are welded thereto at 30. The inturned flange portions 28 are cut away at 31 to receive the legs. These base bars adapt the pallet for use on conveyors, particularly the roller type, and also serve as runners when the pallet is dragged about on the floor.

It is desirable that the joist members of the deck bed be arranged in closely spaced pairs to extend between the opposed pairs of legs as is shown in Fig. 3. It will be understood that the greatest stress occurs at the legs when, for example, a leg is struck by a truck as is frequently done in use, sometimes accidentally and frequently intentionally for pushing or dragging the pallet along on a floor or deck. With this arrangement the parts serve to reinforce and brace each other with the result that my improved pallet is capable of carrying heavy loads and withstanding severe usage and shocks.

I have not illustrated or described other embodiments or adaptations of my invention as it is believed that this disclosure will enable those skilled in the art to embody or adapt my invention as may be desired.

Having thus described my invention, what I claim as new and desire to secure by Letters Patent is:

1. In a material handling pallet the combination of a deck bed comprising side sill members of upwardly facing channel section having aligned openings in their inner flanges extending to the webs thereof, joist members of upwardly facing channel section disposed in said openings in supported engagement with the web portions of the sill members, the joist members being fixedly secured to the sill members, a grid-like deck flooring unit disposed on said deck bed and comprising an upper and a lower series of spaced elements weldingly connected at their crossing points, the lower series of the flooring elements being disposed on and welded to the flanges of the sill members, the upper series being disposed on and welded to the flanges of said joist members, and opposed pairs of cast leg members spaced longitudinally of said sill members and having upwardly facing U-shaped integral saddle portions in which said sill members are supportedly seated with the arms of the leg member seats supportedly engaging the opposite sides of the sill member, said leg members being fixedly secured to the sill members.

2. In a material handling pallet the combination of a deck bed comprising side sill members of upwardly facing channel section having aligned openings in their inner flanges extending to the webs thereof, joist members of upwardly facing channel section disposed in said openings in supported engagement with the web portions of the sill members, the webs and flanges of the joist members being welded to the webs and inner flanges of the sill members, deck flooring disposed on said deck bed, and opposed pairs of leg members spaced longitudinally of said sill members and having upwardly facing saddle portions in which said sill members are supportedly seated, said saddle portions having upwardly projecting portions embracing the flanges of the sill members, said leg members being welded to the webs and flanges of the sill members, there being a spaced pair of joist members closely adjacent to each opposed pair of leg members.

3. In a material handling pallet the combination of a deck bed comprising side sill members of upwardly facing channel section having aligned openings in their inner flanges extending to the webs thereof, joist members of upwardly facing channel section disposed in said openings in supported engagement with the web portions of the sill members, the webs and flanges of the joist members being welded to the webs and inner flanges of the sill members, deck flooring disposed on said deck bed, and leg members spaced longitudinally of said sill members and having upwardly facing saddle portions in which said sill members are supportedly seated, said saddle portions having upwardly projecting portions embracing the flanges of the sill members, said leg members being welded to the webs and flanges of the sill members.

4. In a material handling pallet the combination of a deck bed comprising side sill members of upwardly facing channel section having aligned openings in their inner flanges extending to the webs thereof, joist members of upwardly facing channel section disposed in said openings in supported engagement with the web portions of the sill members and with their ends in abutting relation to the inner sides of the outer flanges of the sill members, deck flooring disposed on said deck bed, and leg members spaced longitudinally of said sill members and having upwardly facing saddle portions in which said sill members are supportedly seated, said saddle portions having upwardly projecting portions embracing the flanges of the sill members, said leg members being fixedly secured to the sill members.

5. In a material handling pallet the combination of a deck bed comprising side sill members of upwardly facing channel section having aligned openings in the inner flanges thereof, joist members of upwardly facing channel section disposed in said openings in supported engagement with the sill members and weldingly connected thereto and constituting tie members for the sill members, a grid-like flooring unit comprising an upper series and a lower series of fixedly connected spaced elements disposed on said deck bed with its lower elements fixedly connected to the flanges of the sill members and its upper elements fixedly connected to the flanges of the joist members, cast leg members spaced longitudinally of the sill members and having upwardly facing U-shaped saddle portions in which said sill members are supportedly seated, said saddle portions having upwardly projecting portions embracing the flanges of the sill members, said leg members being fixedly secured to said sill members.

6. In a material handling pallet the combination of a deck bed comprising side sill members of upwardly facing channel section having aligned openings in the inner flanges thereof, joist members of upwardly facing channel section disposed in said openings in supported engagement with the sill members and weldingly connected thereto and constituting tie members for the sill members, deck flooring disposed on said deck bed, leg members spaced longitudinally of the sill members and on which said sill members are supportedly seated, said leg members being fixedly secured to said sill members, said leg members having base portions with downwardly facing stacking recesses at the outer ends thereof, and upwardly facing channel shaped base bars disposed on said base portions, the base portions of said legs being seated in the bottoms of said base bars, the flanges being welded to said leg members.

References Cited in the file of this patent
UNITED STATES PATENTS

| | | |
|---|---|---|
| 2,622,830 | Coit | Dec. 23, 1952 |
| 2,635,786 | Wickson | Apr. 21, 1953 |
| 2,648,455 | Bitney | Aug. 11, 1953 |
| 2,667,319 | Coit | Jan. 26, 1954 |

FOREIGN PATENTS

| | | |
|---|---|---|
| 519,055 | France | June 4, 1921 |